Figure 1:
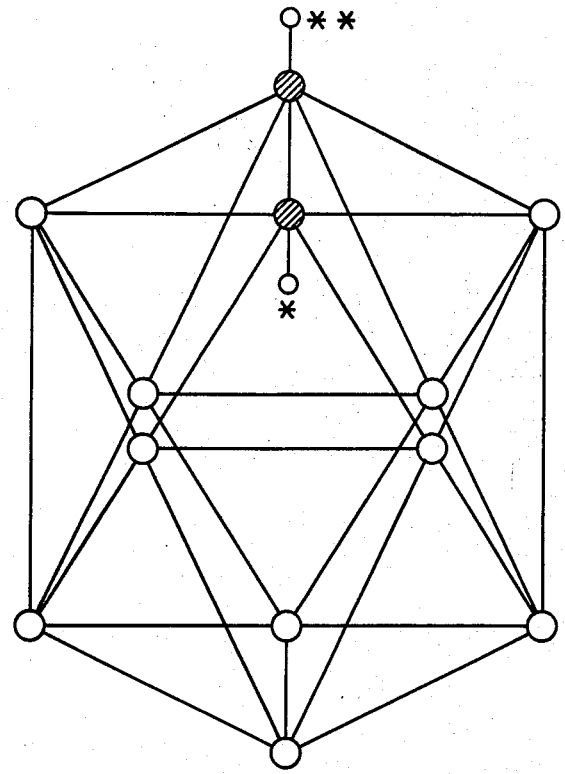

May 12, 1964   J. W. AGER, JR., ET AL   3,133,121
REACTION PRODUCTS OF DECABORANES AND ACETYLENIC HALIDES
AND THEIR PREPARATION
Filed March 6, 1959                           2 Sheets-Sheet 1

FIG. I

○ BORON

◍ CARBON

○ HYDROGEN ON CARBON
(HYDROGEN ATOMS ON
BORON OMITTED FOR
CLARITY)

*INVENTORS*
JOHN W. AGER, JR.
THEODORE L. HEYING
BY   DONALD J. MANGOLD

*Adams Forward and McLean*

ATTORNEYS

○ BORON
◍ CARBON
○ HYDROGEN ON CARBON
(HYDROGEN ATOMS ON BORON OMITTED FOR CLARITY)

INVENTORS
JOHN W. AGER, JR.
THEODORE L. HEYING
BY DONALD J. MANGOLD

Adams Forward and McLean
ATTORNEYS

United States Patent Office 3,133,121
Patented May 12, 1964

3,133,121
REACTION PRODUCTS OF DECABORANES AND ACETYLENIC HALIDES AND THEIR PREPARATION
John W. Ager, Jr., Buffalo, Theodore L. Heying, Tonawanda, and Donald J. Mangold, Youngstown, N.Y., assignors to Olin Mathieson Chemical Corporation, New York, N.Y., a corporation of Virginia
Filed Mar. 6, 1959, Ser. No. 797,810
21 Claims. (Cl. 260—606.5)

This invention relates to halogen containing organoboron compounds and to a method for their preparation. The halogen containing organoboron compounds are prepared by the reaction of decaborane or an alkylated decaborane having 1 to 2 alkyl groups containing 1 to 5 carbon atoms in each alkyl group with a mono- or di-halogenated alkyne containing from 2 to 10 carbon atoms. The reaction products prepared by the method of this invention can be either solid or liquid and are useful as fuels.

The preparation of decaborane is known in the art. Lower alkyl decaboranes such as monomethyldecaborane, dimethyldecaborane, monoethyldecaborane, diethyldecaborane, monopropyldecaborane and the like can be prepared, for example, according to the method described in application Serial No. 497,407, filed March 28, 1955, by Elmar R. Altwicker, Alfred B. Garrett, Samuel W. Harris and Earl A. Weilmuenster, and issued as U.S. Patent No. 2,999,117 on Sept. 5, 1961.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. Liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with this invention, it was discovered that decaborane or alkylated decaboranes having 1 to 2 alkyl groups containing 1 to 5 carbon atoms in each alkyl group will react with a halogen containing acetylenic compound containing from 2 to 10 carbon atoms and from 1 to 2 halogen atoms in the presence of any of a wide variety of amines, ethers, nitriles or sulfides. Suitable acetylenic compounds include propargyl bromide; propargyl iodide; diiodoacetylene; 3-chlorobutyne-1; 3-bromobutyne-1; 4-bromobutyne-1; 1,4-dichlorobutyne-2; 1-bromopentyne-1; 1-chloropentyne-3; 1-bromopentyne-3; 1-bromohexyne-1; 2-bromo-2-methylbutyne-3; and the like. Suitable amines include methylamine, ethylamine, n-propylamine, isopropylamine, 2-aminopentane, tert-amyl-amine, dimethylamine, diethylamine, di-n-propylamine, di-sec-butylamine, methylethylamine, trimethylamine, triethylamine, ethylenediamine, propylenediamine, 1,3-diaminobutane, hexamethylenediamine, and octamethylenediamine. Suitable ethers include dimethyl ether, diethyl ether, methyl ethyl ether, di-n-propyl ether, diisopropyl ether, ethyl n-butyl ether, di-n-butyl ether, ethlene glycol dimethyl ether, dioxane, and tetrahydrofuran. Suitable nitriles include hydrogen cyanide, acetonitrile, propionitrile, butyronitrile, isobutyronitrile, dimethyl propionitrile, valeronitrile, acrylonitrile, 3-butenenitrile, 4-pentenenitrile, succinonitrile, malononitrile, adiponitrile, and $\beta,\beta'$-oxydipropionitrile. Suitable sulfides include dimethyl sulfide, diethyl sulfide, ethyl methyl sulfide, diisopropyl sulfide, ethyl propyl sulfide, di-n-butyl sulfide and diphenyl sulfide.

The ratio of reactants can be varied widely, generally being in the range of 0.05 to 20 moles of decaborane or alkyldecaborane per mole of acetylenic compound and preferably in the range of 0.3 to 1.5 moles of decaborane or alkyldecaborane per mole of acetylenic compound. The ratio of amine, ether, nitrile, or sulfide to borane also can be varied widely, generally being in the range of 0.001 to 100 moles of amine, ether, nitrile, or sulfide per mole of decaborane or alkyldecaborane, and preferably being in the range of 0.05 to 20 moles of ether, nitrile, sulfide or amine per mole of decaborane or alkyl decaborane. The reaction temperature can vary widely, generally being from 25° to 180° C. and preferably between 50° and 100° C. The reaction pressure can vary from subatmospheric to several atmospheres, i.e., from 0.2 to 20 atmospheres, although atmospheric pressure reactions are convenient. The degree of completeness of the reaction can be determined by the rate and quantity of hydrogen evolved, the rate at which solid products form and precipitate from solution, or by analysis of the reaction mixture. The reaction generally requires about 1 to 175 hours, depending upon the ratio of reactants, the particular reactants and solvents employed and the temperature and pressure of the reaction.

The reaction can or need not be conducted in a solvent common for the reactants but inert with respect to the reactants. Such solvents include hydrocarbon solvents such as n-pentane, hexane, and heptane, aromatic hydrocarbon solvents such as benzene, toluene, and xylene, and cycloaliphatic solvents such as cyclohexane and methylcyclohexane. The amount of solvent can vary widely but generally ranges up to about 50 times the weight of the reactants.

The process of the invention is illustrated in detail by the following examples. In the examples, the term "moles" signifies gram moles.

EXAMPLE 1

A solution of 15.0 g. (0.123 mole) of decaborane in about 150 ml. (1.69 moles) of benzene was prepared and to it were added 5 g. (0.122 mole) of acetonitrile and 15.0 g. (0.126 mole) of propargyl bromide in a 500 ml. flask fitted with a condenser which was protected with a calcium chloride tube. The mixture was allowed to reflux for 68 hours. After cooling, the benzene was distilled off, the residue was finally concentrated under reduced pressure and the residue was thereafter distilled. A clear white liquid product distilled. The following boiling points were recorded: 81–83° C. at about 0.8 mm. of mercury absolute pressure while distilling; 63–64° C. at 0.2 mm. of mercury absolute pressure while totally refluxing; and 66–70° C. at 0.2 mm. of mercury absolute pressure while distilling. After the distillation was stopped, it was obvious that all the product was not collected since all the walls were wet and there was some reflux in the pot, which contained a large amount of red-orange residue. A yield of 24.0 g. of product, 82.5 percent of theoretical (29.1 g.) was obtained. This product was shown by mass spectrometric analysis to be

$B_{10}H_{10}CHCCH_2Br$ of 97 percent purity together with decaborane.

EXAMPLE 2

To a 500 ml. one-necked flask equipped with a condenser and calcium chloride tube were charged 30 g. (0.246 mole) of decaborane, 30 g. (0.254 mole) of propargyl bromide, 10 g. (0.244 mole) of acetonitrile and 210 ml. (2.35 moles) of benzene. The solution was refluxed for 141½ hours and then cooled. The benzene was removed by distillation and the reaction product was transferred to a 100 ml. flask. 35.65 g. of product were removed by distillation between 80° C. at 0.25 mm. to 87° C. at 0.20 mm. Hg absolute. The residue was a very viscous dark brown liquid weighing about 14 g.

EXAMPLE 3

To a 300 ml. one-necked flask equipped with a condenser and calcium chloride tube were charged 15 g. (0.123 mole) of decaborane dissolved in 150 ml. (1.69 moles) of benzene, 5 g. (0.122 mole) of acetonitrile, and 15 g. (0.127 mole) of propargyl bromide. The mixture was refluxed for about 99 hours, at which time a sample analyzed mass spectrometrically was found to contain 3.2 percent decaborane and 96.8 percent $B_{10}H_{10}CHCCH_2Br$ Refluxing was continued for an additional 68 hours, after which the sample was cooled and the benzene was removed by distillation. The material remaining was transferred to a smaller flask. The remaining benzene was removed under reduced pressure. The product was distilled. 21.43 g. of clear liquid were collected from 75° C. at 0.3 mm. to 92° C. at 0.5 mm. Hg absolute. The product solidified on standing.

EXAMPLE 4

To a 300 ml. one-necked flask equipped with a condenser and calcium chloride tube were charged 15 g. (0.123 mole) of decaborane dissolved in 150 ml. (1.69 moles) of benzene, 5 g. (0.122 mole) of acetonitrile and 15 g. (0.127 mole) of propargyl bromide. Refluxing was begun, and samples analyzed mass spectrometrically were found to contain 3.2 percent decaborane, 2.8 percent product and 92.0 percent benzene after 19 hours and 1.3 percent decaborane, 4.6 percent product, and 94.1 percent benzene after 46½ hours. The refluxing was stopped after 49 hours. The reaction mixture was filtered to yield a very small amount of brown solid. The benzene was removed from the filtrate by distillation and the filtrate residue was transferred to a smaller flask. 22.22 g. of yellow liquid were distilled from the filtrate residue at 67–81° C. and 0.3 mm. Hg absolute pressure. Part of the distillate crystallized during distillation. The distillate was found by mass spectrometric analysis to contain 15.6 percent decaborane and 84.4 percent $B_{10}H_{10}CHCCH_2Br$. The residue was a dark brown viscous liquid and weighed about 3.1 g. An attempt was made to remove decaborane from the distillate by sublimation but some of the product also sublimed.

An attempt then was made to purify the distillate by precipitating the unreacted decaborane as sodium decaborane. The distillate was dissolved in a small amount of ethyl bromide. Some sodium hydride was added and allowed to stand about 2 hours. The mixture was filtered. The ethyl bromide was removed by distillation and the product was distilled. A clear, colorless liquid was distilled between 89 and 91° C. at an absolute pressure of 0.5 mm. of mercury. The distillate was found by mass spectrometric analysis to contain 7.1 percent decaborane and 92.9 percent product $(B_{10}H_{10}CHCCH_2Br)$.

EXAMPLE 5

Into a 100 ml. round bottom flask fitted with a nitrogen inlet and a reflux condenser were placed 100 ml. (1.13 moles) of dry benzene, 6.1 g. (0.05 mole) of decaborane, 5 ml. (0.063 mole) of propargyl bromide and 10 drops (about 0.004 mole) of acetonitrile. The solution was allowed to reflux with stirring for 20 hours after which time it was allowed to cool. The solution then was evaporated to dryness. The solids remaining were analyzed mass spectrometrically, which gave evidence for the compound $B_{10}H_{10}CHCCH_2Br$ by the fact that a "cut off" peak was present at 240 in the mass spectrum. However, considerable decaborane was still present. By dissolving the mixture in n-pentane and cooling to −78° C., considerable decaborane was precipitated out and filtered off. The remaining solution then was evaporated to dryness. The solid still contained a high percentage of decaborane. These solids were not purified further since the evidence was obtained that the reaction of decaborane and propargyl bromide will take place in the presence of small quantities of acetonitrile.

EXAMPLE 6

A 100 ml. three-necked flask was equipped with an additional funnel, condenser and a nitrogen inlet. 3 g. (0.025 mole) of decaborane were dissolved in 30 ml. (0.37 mole) of dry tetrahydrofuran in the reaction flask. A solution of 6 g. (0.05 mole) of propargyl bromide in 15 ml. of tetrahydrofuran was put in the addition funnel. The system was swept with nitrogen. The temperature of the bath was raised to 70° C. The addition of propargyl bromide solution was started, and after 15 minutes the addition was complete, the temperature of the bath being 78° C. The temperature was maintained at 80±5° C. for 68 hours. The reaction flask was removed from the hot bath and allowed to cool. The reaction mixture was a clear, light yellow solution. A portion was removed for mass spectrometric analysis and was found to contain 76.7 percent tetrahydrofuran, 12.9 percent decaborane, and 10.4 percent $B_{10}H_{10}CHCCH_2Br$. The tetrahydrofuran was removed by distillation. A small amount of decaborane sublimed to the walls of the condenser. The product, weighing 5.18 g., was a yellow-brown liquid, found by mass spectrometric analysis to contain 30.1 percent decaborane, 68.3 percent $B_{10}H_{10}CHCCH_2Br$, and 1.6 percent tetrahydrofuran. An attempt was made to distill 4.15 g. of the liquid. Some decaborane sublimed, and a clear liquid was collected between 81 and 86° C. at 0.7 mm. Hg pressure absolute. After standing overnight a solid had crystallized from the distillate. The distillate weighed about 2.4 g. It was filtered and 0.29 g. of white solid was collected which was shown by mass spectrometric analysis to be 65.0 percent decaborane and 35.0 percent $B_{10}H_{10}CHCCH_2Br$. The filtrate was a clear colorless liquid shown by mass spectrometric analysis to be 29.1 percent decaborane, 70.2 percent $B_{10}H_{10}CHCCH_2Br$, and 0.7 percent tetrahydrofuran. The residue from the distillation weighed about 1.9 g. and was a dark brown liquid shown by mass spectrometric analysis to be 95.0 percent $B_{10}H_{10}CHCCH_2Br$ and 5.0 percent tetrahydrofuran.

EXAMPLE 7

To a 100 ml. three-necked flask equipped with addition funnel, condenser and nitrogen inlet was charged a solution of 3.0 g. (0.025 mole) of decaborane in 30 ml. (0.37 mole) of dry tetrahydrofuran. 6.0 g. (0.05 mole) of propargyl bromide were added through the addition funnel and this was followed by the addition of 2.5 g. (0.034 mole) of diethylamine. The system was swept with nitrogen and heating was begun. The reflux temperature was reached and maintained for 66½ hours. Some yellow solid was removed by filtration. A portion of the clear brown tetrahydrofuran solution was shown by mass spectrometric analysis to contain 95.9 mole percent of tetrahydrofuran, 2.8 mole percent of $B_{10}H_{10}CHCCH_3$, and 1.3 percent $B_{10}H_{10}CHCCH_2Br$. The tetrahydrofuran was removed by distillation, leaving a brown viscous liquid. An attempt was made to distill the viscous liquid. A small amount of liquid was collected at a temperature of 87 to 93° C. and a pressure of 0.9 mm. of mercury absolute. It was shown by mass spectrometric analysis to be 19 percent $B_{10}H_{10}CHCCH_2Br$ and 41 percent $$B_{10}H_{10}CHCCH_3$$

The residue was a thermoplastic resin.

EXAMPLE 8

3.0 g. (0.025 mole) of decaborane and 30 ml. (0.37 mole) of dry tetrahydrofuran were charged to a 100 ml. three-necked flask equipped with condenser, addition funnel and nitrogen inlet. 6.0 g. (0.05 mole) of propargyl bromide were added to the decaborane solution through the addition funnel and this addition immediately was followed by the addition of 3.0 g. (0.03 mole) of triethylamine. The system was swept with nitrogen and heating was begun. The temperature reached reflux temperature and was held there for 18¼ hours. The reaction mixture was filtered after cooling. A large amount of creamy solid was removed. The tetrahydrofuran solution was brown, and was found by mass spectrometric analysis to contain 96.3 mole percent tetrahydrofuran, 3.1 percent $B_{10}H_{10}CHCCH_3$, and 0.6 percent $B_{10}H_{10}CHCCH_2Br$. The tetrahydrofuran was removed by distillation. An attempt was made to distill the product. Some white solid sublimed to the walls of the distilling head and a small amount of liquid was distilled at reduced pressure. The residue was a thermoplastic resin.

EXAMPLE 9

A 100 ml. three-necked flask was equipped with a condenser closed with a calcium chloride tube. 2.0 g. (0.016 mole) of decaborane, 2.0 g. (0.017 mole) of propargyl bromide, 0.5 ml. (0.008 mole) of diethyl sulfide, and 25 ml. (0.28 mole) of benzene were charged to the flask. Refluxing was begun, and after 2 hours a sample was found by mass spectrometric analysis to contain $$B_{10}H_{10}CHCCH_2Br$$

and decaborane in the ratio of 0.25 to 1.

EXAMPLE 10

A mixture of 10 g. (0.082 mole) of decaborane, 4 ml. (0.037 mole) of diethyl sulfide and 40 ml. (0.29 mole) of di-n-propyl ether was placed in a 125 ml. three-necked flask equipped with a condenser and an addition funnel. The mixture was refluxed for ½ hour and then allowed to cool to 70° C. Propargyl bromide (10 g., 0.084 mole) was added slowly from the addition funnel. The addition took about 1 hour during which time the temperature rose to 85° C. and a gas was evolved. After the addition, the mixture was refluxed for 3 hours and then allowed to stand overnight. The solvent then was distilled off at reduced pressure and at about 40° C. The oily residue was transferred to a 50 ml. flask and the product distilled at a temperature of 80–85° C. and an absolute pressure of 0.4 mm. of mercury. 13.9 g. of product was obtained, a 69.5 percent yield of $$B_{10}H_{10}CHCCH_2Br$$

The product was found by chemical analysis to contain 45.4, 45.4, 45.3 percent boron, 15.8, 16.0 percent carbon, and 5.62, 5.87 percent hydrogen, which correspond to calculated values of 45.6 percent boron, 15.2 percent carbon and 5.52 percent hydrogen for the compound $$B_{10}H_{10}CHCCH_2Br$$

It had a melting point of 30° C.

EXAMPLE 11

A mixture of 5.0 g. (0.033 mole) of monoethyldecaborane, 5.0 g. (0.042 mole) of propargyl bromide, 1.75 g. (0.043 mole) of acetonitrile and 50 ml. (0.56 mole) of benzene was charged to a one-neck flask equipped with a condenser closed with a calcium chloride tube. The mixture was refluxed for 215 hours. Samples taken after 140 and 190 hours were found by mass spectrometric analysis to be essentially the same, both having substantial amounts of $C_2H_5B_{10}H_9(CHCCH_2Br)$ with smaller amounts of $B_{10}H_{10}CHCCH_2Br$ and ethyldecaborane.

After removal of the benzene, an attempt was made to fractionate the product using a heated packed column. A fraction, weighing 2.76 g., was collected between 85° C. at a pressure of 0.6 mm. of mercury absolute and 105° C. at a pressure of 0.9 mm. of mercury absolute. A second fraction, weighing 2.85 g., was collected at 101–103° C. at a pressure of 0.5 mm. af mercury absolute.

The first fraction was found by mass spectrometric analysis to contain ethyldecaborane as well as the product $(C_2H_5B_{10}H_9CHCCH_2Br)$, while the second fraction was found to be fairly pure product $$(C_2H_5B_{10}H_9CHCCH_2Br)$$

substantially free of ethyldecaborane. The second fraction was found to contain 40.5 percent boron, 24.0 percent carbon, and 6.84 percent hydrogen. These compare with calculated values of 42.2 percent boron, 23.4 percent carbon and 6.64 percent hydrogen.

EXAMPLE 12

10 g. (0.082 mole) of decaborane were reacted with 11 g. (0.083 mole) of 1,4-dicholrobutyne-2 in the presence of 3 ml. (0.028 mole) of diethyl sulfide and 40 ml. of diethyl ether. The reaction was carried out in a 250 ml. autoclave, fitted with a rupture disc and pressure gauge, at a temperature of 90° C. The reaction was monitored by noting the pressure developed in the reaction vessel caused by the liberation of hydrogen. At the end of 7 hours the reaction was observed to have come to completion but the heating was continued for another 3 hours. At the end of this period of time a pressure of the order of 300–330 p.s.i.g. was noted. Upon cooling to room temperature the pressure diminished to approximately 200 to 250 p.s.i.g.

The liberated hydrogen was released and the diethyl ether was removed from the reaction mixture by evaporation. The remaining slurry was dissolved in about 250 ml. of n-pentane and filtered. The clear pentane solution then was cooled to −78° C. (Dry Ice temperature) and the resulting crystals were removed by filtration. The crude solid product weighed 13.5 g., corresponding to a yield of 69 percent. A sample of the product was sublimed three times, dissolved in methanol to remove traces of decaborane, and finally recrystallized from n-pentane.

The recrystallized product was found by mass spectrometric analysis to be $B_{10}H_{10}[C(CH_2Cl)C(CH_2Cl)]$. It was found to have a melting point of 119–120.5° C. Chemical analysis showed the product to contain 44.25 percent boron, 30.0 percent chlorine, 21.0 percent carbon, and 7.04 percent hydrogen, compared with 44.9 percent boron, 19.9 percent carbon, 29.4 percent chlorine, and 5.85 percent hydrogen calculated for $$B_{10}H_{10}[C(CH_2Cl)C(CH_2Cl)]$$

EXAMPLE 13

Example 13 shown in Table I was performed in a similar manner.

Table I

| Example No. | Decaborane (mole) | 1,4-dichlorobutyne-2 (mole) | Diethyl Sulfide (mole) | Diethyl Ether, ml. | Temperature, ° C. | Product, g. | Yield, percent |
|---|---|---|---|---|---|---|---|
| 12 | 0.082 | 0.083 | 0.028 | 40 | 90 | 13.5 | 69 |
| 13 | 0.082 | 0.083 | 0.028 | 40 | 90 | 11.7 | 59.7 |

EXAMPLE 14

15 g. of decaborane, 20 g. of 1-bromo-1-pentyne, 45 cc. dioxane, and 9 cc. diethyl sulfide were mixed in a 250 cc. one-necked flask fitted with a water-cooled reflux condenser. The mixture was heated with stirring at 80–90° C. for 2 hours. Over 4.2 liters of gas were evolved. After another hour at reflux temperature the gas evolution ceased. Over 4.7 liters of gas had been evolved altogether. The resultant solution was a clear light brown liquid.

The resultant solution was then distilled. After the solvent had been distilled off, a fraction began coming over at 95–108° C. at 0.5–1.0 mm. Hg absolute. When the temperature reached about 108° C., the temperature suddenly rose sharply, gas was evolved, the distillate began coming over red and voluminous solids built up in the pot. The distillate was charged into another distillation apparatus, and redistilled at 95–107° C. at 0.5–1.0 mm. Hg absolute. 12.4 g. of clear liquid were obtained. Upon standing, the liquid crystallized into a white solid, M.P. 36–40° C. Yield of this experiment was about 36 percent $B_{10}H_{10}[C(Br)C(CH_2CH_2CH_3)]$.

EXAMPLE 15

14.4 g. 1-bromo-1-pentyne, 11.0 g. decaborane, 35 cc. dioxane, and 7 cc. of ethyl sulfide were placed in a 200 ml. round bottom flask with a water-cooled condenser fitted with a drying tube. The mixture was heated to 70–80° C., for 1 hour and then refluxed for 2 hours. At the end of the 2 hours reflux period, there was no more gas evolution. The dioxane was removed under vacuum and the remaining liquid was vacuum distilled.

A fraction collected at 99–101° C. at less than 1 mm. Hg absolute (90 percent of crude). This fraction was distilled to yield about 16 g. Yield, 66 percent based on decaborane, of $B_{10}H_{10}[C(Br)C(CH_2CH_1CH_3)]$.

EXAMPLE 16

A solution of 4.6 g. (0.0375 mole) of decaborane, 1.5 g. (0.0375 mole) of acetonitrile and 6.4 g. (0.041 mole) of 1-bromo-1-hexyne (prepared by the method of McCusker and Vogt for 1-bromo-1 alkynes, J. Am. Chem. Soc., 59, 1307 (1937) using 0.2 molar quantities of reactants and substituting hexyne for heptyne) in benzene (30 ml.) was prepared and refluxed for 42 hours. During this time the solution became deep red. The solution was transferred to a still and the volatile materials were removed under reduced pressure. The deep red residue was heated and, after removal of about 0.7 g. of decaborane, a yellow liquid distilled at about 85° C. at a pressure of 0.5 mm. of mercury absolute. The material was found to have an index of refraction of $n^{23}=1.5500$ (corrected to $n^{25}=1.5492$) and was identified by mass spectrometric analysis as essentially pure $B_{10}H_{10}[C(Br)C(CH_2CH_2CH_2CH_3)]$. The material solidified on standing.

EXAMPLE 17

15.5 g. (0.0962 mole) of 1-bromo-1-hexyne, 11.0 g. (0.0902 mole) of decaborane, 7 cc. of diethyl sulfide, and 35 cc. of 1,4-dioxane were placed in a 200 ml. round bottom flask with a water cooled condenser protected by a potassium hydroxide drying tube. The reaction mixture was agitated by a Teflon coated stirring bar and heated with a water bath to 60 to 70° C. for two hours. Evolution of hydrogen was monitered with a Nujol-filled bubble counter. The reaction mixture then was refluxed for two and one half hours.

Using a simple distillation apparatus and on heating the distillation flask above 170° C., the product distilled at approximately 100° C. at less than 1 mm. Hg pressure absolute. 7.5 g. of product were collected, which was found by mass spectrometric analysis to be only $B_{10}H_{10}[C(Br)C(CH_2CH_2CH_2CH_3)]$. Some of the product was found by mass spectrometric analysis to be present in the distillation residue.

EXAMPLE 18

5.9 g. (0.028 mole) of 1-iodo-1-hexyne (prepared from hexyne-1 and iodine using sodium in liquid ammonia) were placed in a 125 ml. three necked flask equipped with a water cooled condenser. To this were added 3.46 g. (0.028 mole) of decaborane, 30 cc. of benzene and 2.0 cc. (0.022 mole) of ethyl sulfide. The mixture was stirred by a Teflon coated stirring bar.

The mixture was colorless until ethyl sulfide was added, when it turned yellow, and resulted in a brown or iodine color at the reflux temperature. The refluxing was continued for a total of 12 hours, resulting in a yellow solution. The benzene was removed under vacuum and the material was distilled.

A large amount of solid residue did not distill. The melting point of the distillate indicated that decaborane was present. Mass spectrometric analysis indicated predominantly $B_{10}H_{10}CHC(CH_2CH_2CH_2CH_3)$ and

$$B_{10}H_{10}C(I)C(CH_2CH_2CH_2CH_3)$$

with the former present in greater amount.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, halogen, carbon and hydrogen present in the products burn to boric oxide, hydrogen halide, carbon dioxide and water vapor. In the case of the $B_{10}H_{10}(CHCCH_2Br)$, for example, this local fuel to air ratio by weight is approximately 0.081. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the after-burner may also occur under these conditions of extreme altitude operation with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet the liquid fuels of this invention will be simply substituted for hydrocarbon fuels and used in the established manner.

The compounds of the formula $B_{10}H_{10}(CHCCH_2Br)$ prepared as described in Examples 1 through 10 have the same structural formula as shown in FIGURE 1 of the accompanying drawings with the exception that the hydrogen atom indicated by a single asterisk is replaced by $CH_2Br$.

Figure 2:
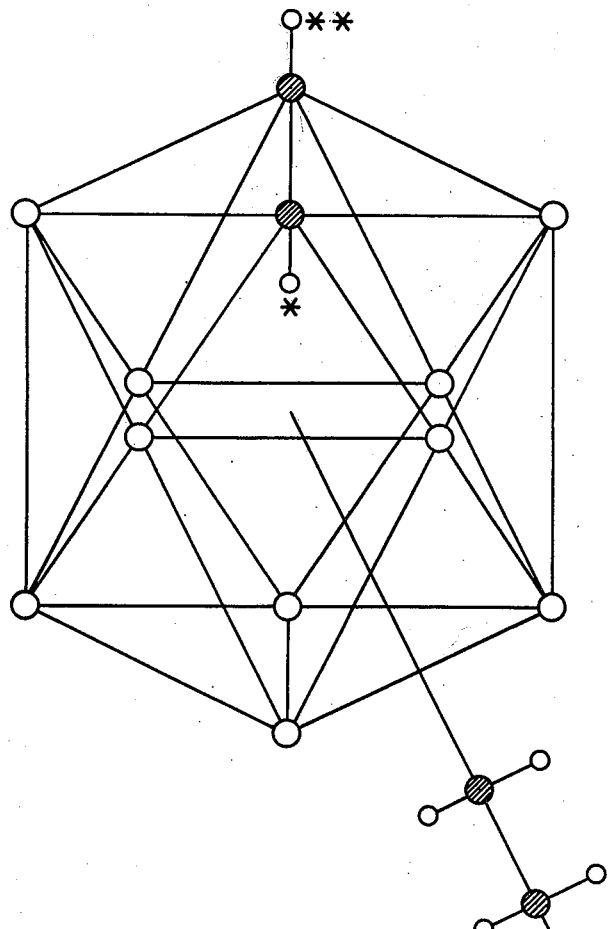

The compound of the formula $$C_2H_5B_{10}H_9(CHCCH_2Br)$$

prepared as described in Example 11 has the same structural formula as shown in FIGURE 2 of the accompanying drawings with the exception that the hydrogen atom indicated by a single asterisk is replaced by $-CH_2Br$.

The compound of the formula $$B_{10}H_{10}[C(CH_2Cl)C(CH_2Cl)]$$

prepared as described in Examples 12 and 13 has the same structural formula as shown in FIGURE 1 with the exception that in the structural formula shown in FIGURE 1 the hydrogen atoms designated with a single and double asterisk are both replaced by $-CH_2Cl$.

The compound of the formula $$B_{10}H_{10}[C(Br)C(CH_2CH_2CH_3)]$$

prepared as described in Examples 14 and 15 has the same structural formula as shown in FIGURE 1 with the exception that in the structural formula shown in FIGURE 1 the hydrogen atom designated with a double asterisk is replaced by $-(CH_2)_2CH_3$ and the hydrogen atom designated with a single asterisk is replaced by $-Br$.

The compound of the formula $$B_{10}H_{10}[C(Br)C(CH_2CH_2CH_2CH_3)]$$

prepared as described in Examples 16 and 17 has the same structural formula as shown in FIGURE 1 with the exception that in the structural formula shown in FIGURE 1 the hydrogen atom designated with a double asterisk is replaced by $-(CH_2CH_2CH_2CH_3)$ and the hydrogen atom designated with a single asterisk is replaced by $-Br$.

The compound of the formula $$B_{10}H_{10}[C(I)C(CH_2CH_2CH_2CH_3)]$$

prepared as described in Example 18 has the same structural formula as shown in FIGURE 1 with the exception that in the structural formula shown in FIGURE 1 the hydrogen atom designated with a double asterisk is replaced by $-(CH_2CH_2CH_2CH_3)$ and the hydrogen atom designated with a single asterisk is replaced by $-I$.

It is claimed:

1. A method for the production of an organoboron compound useful as a fuel which comprises reacting with the formation of hydrogen a borane selected from the group consisting of decaborane and alkyl decaboranes having from one to two alkyl groups containing from one to five carbon atoms in each alkyl group and an acetylenic compound containing from two to ten carbon atoms and from one to two halogen atoms at a temperature within the range from 25° to 180° C. and at a pressure of from 0.2 to 20 atmospheres while the reactants are in admixture with a material selected from the group consisting of lower dialkyl ethers, dioxane, tetrahydrofuran, ethylene glycol dialkyl ethers, hydrogen cyanide, nitriles of the saturated and unsaturated aliphatic mono- and dicarboxylic acids containing 2 to 5 carbon atoms, β,β'-oxydipropionitrile, lower alkyl, dialkyl and trialkyl amines, alkyl diamines containing 2 to 8 carbon atoms, lower dialkyl sulfides and diphenyl sulfide, the molar ratio of said borane to said acetylenic compound being within the range from 0.05:1 to 20:1 and the molar ratio of said material to said borane being within the range from 0.001 to 100:1.

2. The method of claim 1 wherein said borane is decaborane.

3. The method of claim 1 wherein said borane is monoethyldecaborane.

4. The method of claim 1 wherein said acetylenic compound is propargyl bromide.

5. The method of claim 1 wherein said acetylenic compound is 1,4-dichlorobutyne-2.

6. The method of claim 1 wherein said acetylenic compound is 1-bromo-1-pentyne.

7. The method of claim 1 wherein said material is acetonitrile.

8. The method of claim 1 wherein said material is tetrahydrofuran.

9. The method of claim 1 wherein said material is diethyl sulfide.

10. The method of claim 1 wherein said borane is decaborane, wherein said acetylenic compound is propargyl bromide, and wherein said material is acetonitrile.

11. The method of claim 1 wherein said borane is decaborane, wherein said acetylenic compound is propargyl bromide, and wherein said material is tetrahydrofuran.

12. The method of claim 1 wherein said borane is decaborane, wherein said acetylenic compound is propargyl bromide and wherein said material is diethyl sulfide.

13. The method of claim 1 wherein said borane is monoethyldecaborane, wherein said acetylenic compound is propargyl bromide, and wherein said material is acetonitrile.

14. The method of claim 1 wherein said borane is decaborane, wherein said acetylenic compound is 1,4-dichlorobutyne-2, and wherein said material is a mixture of diethyl sulfide and diethyl ether.

15. $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, halogen, alkyl, and haloalkyl radicals at least one of R'' and R''' containing a halogen atom, and the total number of carbon atoms in R'' and R''' taken together not exceeding eight.

16. $B_{10}H_{10}(CHCCH_2Br)$
17. $C_2H_5B_{10}H_9(CHCCH_2Br)$
18. $B_{10}H_{10}[C(CH_2Cl)C(CH_2Cl)]$
19. $B_{10}H_{10}[C(Br)C(CH_2CH_2CH_3)]$
20. $B_{10}H_{10}[C(Br)C(CH_2CH_2CH_2CH_3)]$
21. $B_{10}H_{10}[C(I)C(CH_2CH_2CH_2CH_3)]$

No references cited.